Sept. 3, 1968  R. B. MESROBIAN ET AL  3,400,029
METHOD OF MAKING SPIRAL WOUND CONTAINER BODIES
Filed Jan. 22, 1965  4 Sheets-Sheet 1

INVENTORS
ROBERT B. MESROBIAN
& RICHARD R. SZATKOWSKI

BY Mason, Porter, Diller & Brown
ATTORNEYS

Sept. 3, 1968  R. B. MESROBIAN ET AL  3,400,029
METHOD OF MAKING SPIRAL WOUND CONTAINER BODIES
Filed Jan. 22, 1965  4 Sheets-Sheet 2
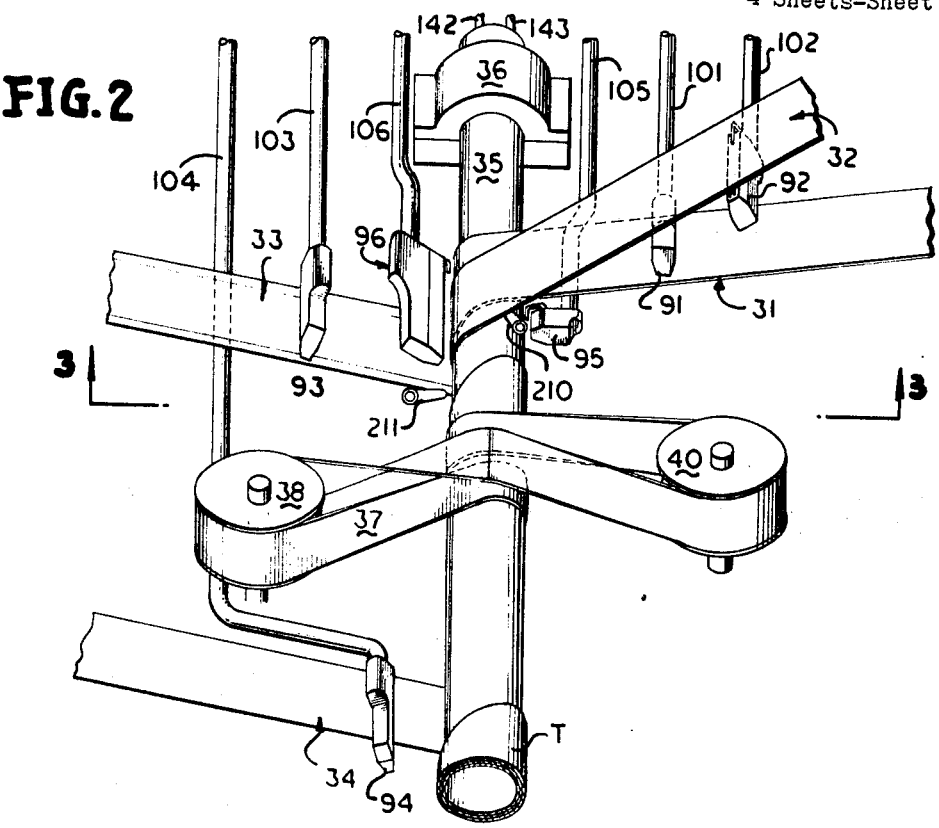
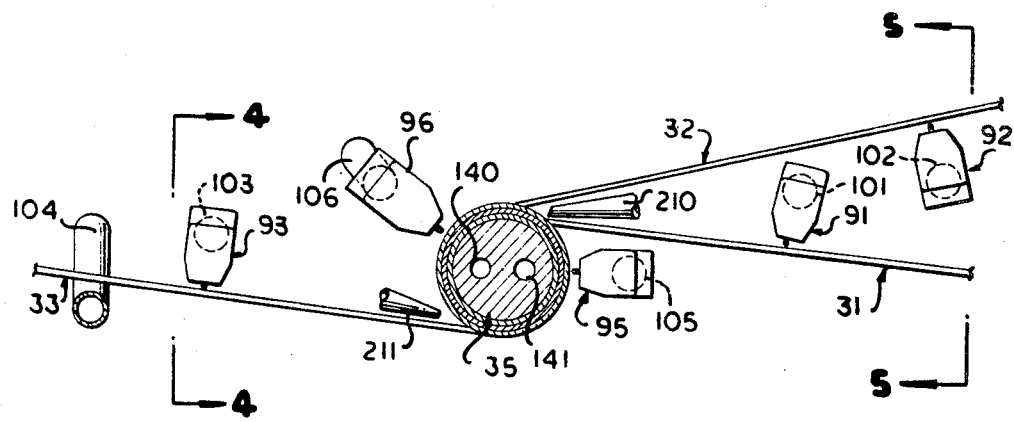
INVENTORS
ROBERT B. MESROBIAN
& RICHARD C. SZATKOWSKI
BY
Mason, Porter, Diller & Brown
ATTORNEYS

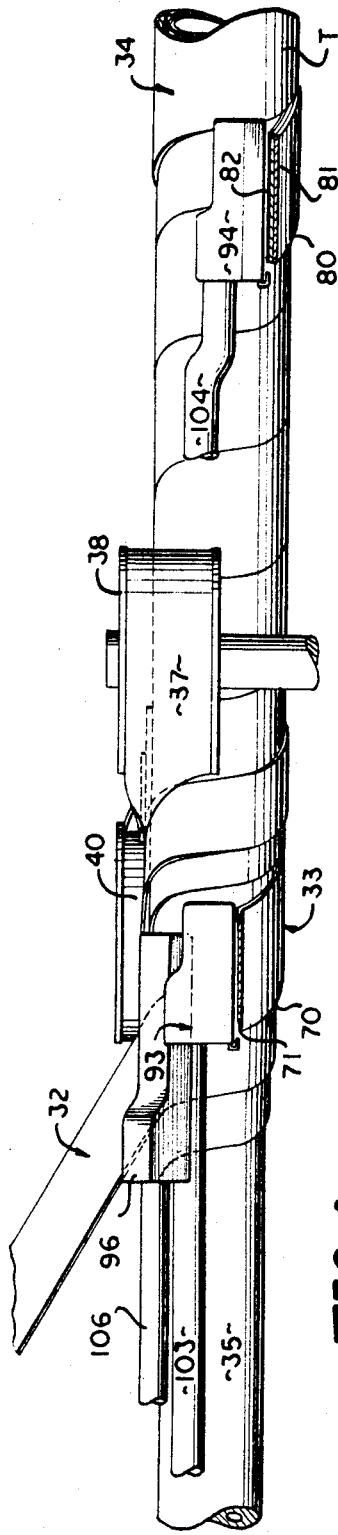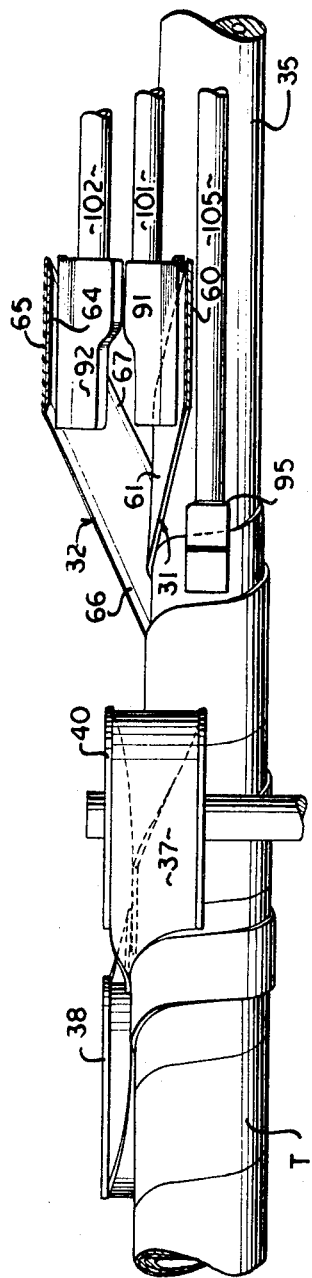

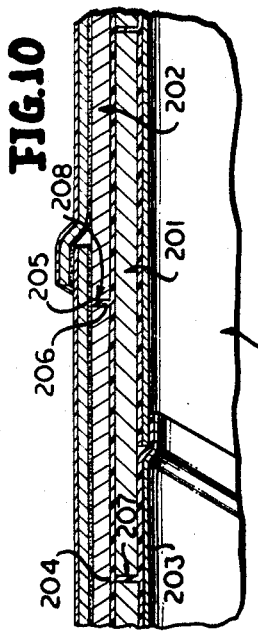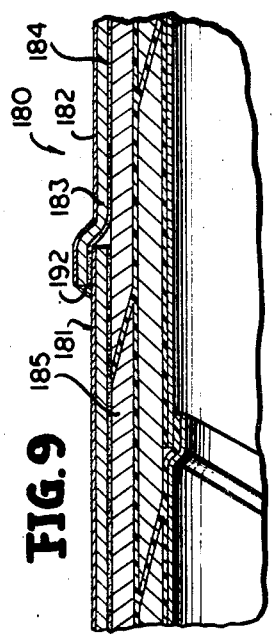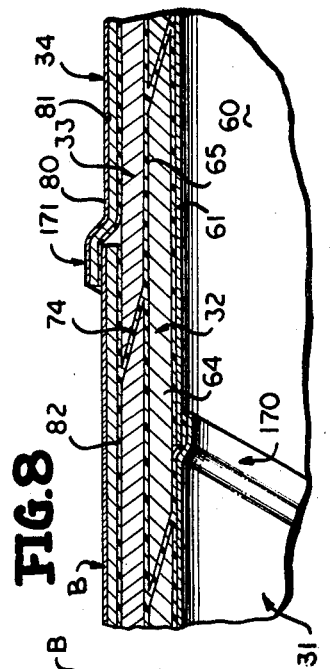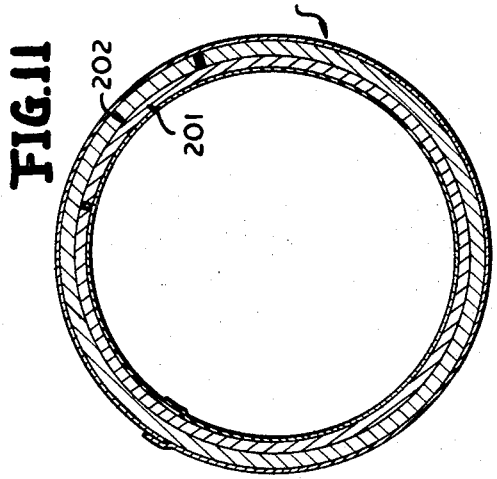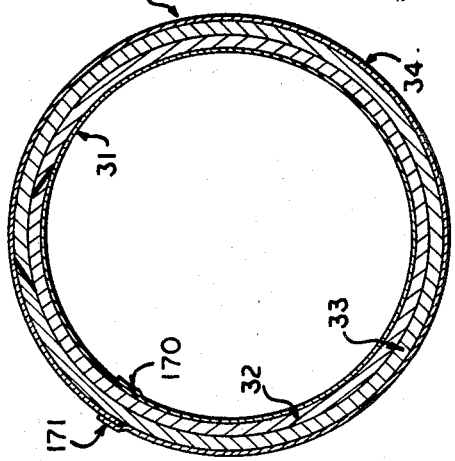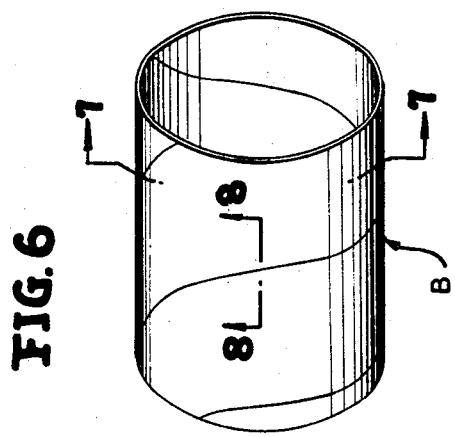
INVENTORS
ROBERT B. MESROBIAN
& RICHARD R. SZATKOWSKI

United States Patent Office 3,400,029
Patented Sept. 3, 1968

3,400,029
METHOD OF MAKING SPIRAL WOUND CONTAINER BODIES
Robert B. Mesrobian, Hinsdale, and Richard R. Szatkowski, Western Springs, Ill., assignors to Continental Can Company, Inc., New York, N.Y., a corporation of New York
Filed Jan. 22, 1965, Ser. No. 427,449
11 Claims. (Cl. 156—82)

ABSTRACT OF THE DISCLOSURE

This invention relates to a novel method of and apparatus for manufacturing composite container bodies by spiral winding a plurality of webs or plies of material about a mandrel, and is particularly directed to the formation of composite container bodies from laminated paper-hot melt adhesive webs and/or laminated metallic-hot melt adhesive webs selectively spiral wound under the application of heat and pressure which causes the hot melt adhesive to flow, fill and seal any spaces or minute openings between or in the webs thereby forming composite container bodies which are more reliably liquid tight and are stronger, particularly under axial loads, than conventional composite container bodies.

---

An object of this invention is to provide a novel method of manufacturing composite container bodies by advancing and uniting at least four webs of material including an inner liner web, an inner structured web, an outer structural web and an outer cover web along predetermined paths toward an area at which the webs are unified, locating hot-melt bondable film material between opposing surfaces of at least three of the webs, applying an emulsion of hot-melt bondable material to a longitudinal edge portion of one of the three webs, arranging the webs with surfaces of the inner and outer structural webs respectively opposing surfaces of the inner liner and outer cover webs and with surfaces of the inner and outer structural webs opposing each other, applying heat to the film material and the emulsion to drive off the solvent of the latter and render each flowable and spiral winding the webs under pressure into a generally tubular container body whereby the spiral-winding pressure causes the flowable film material to fill minute pin-hole openings in the webs and any gaps or spaces between adjacent webs and adjacent web portions of at least one of the webs.

A further object of this invention is to provide a novel method of manufacturing composite container bodies including each of the steps above described and the further step of applying a water soluble adhesive to the fourth of the webs whereby the latent heat of the heated webs at least partially drives off some of the water of the water soluble adhesive during the spiral winding of the webs.

A further object of this invention is to provide a novel method of manufacturing composite container bodies including the steps defined above, and applying a coating of lubricating material or slip-agent material to an innermost surface of the inner liner web prior to the application thereof to a mandrel of a spiral winding machine to facilitate the advancement of the webs along the mandrel during a spiral winding operation.

A further object of this invention is to provide a novel method of manufacturing composite container bodies by advancing at least four webs of material including an inner liner web, an inner structural web, an outer structural web and an outer cover web along predetermined paths toward and upon a mandrel on which the webs are spirally wound by a winding belt, locating hot-melt bondable film material between opposing surfaces of at least three of the webs, applying an emulsion of hot-melt bondable material to a longitudinal edge portion of one of the three webs, arranging the webs with surfaces of the inner and outer structural webs respectively opposing surfaces of the inner liner and outer cover web and with surfaces of the inner and outer structural webs opposing each other, applying open flames to selected ones of the webs to heat the film material and the emulsion to drive off the solvent of the latter and render each flowable, spiral winding the webs under pereessure about the mandrel into a generally tubular body whereby the spiral winding pressure causes the flowable film material to fill any spaces in or between the webs or between portions thereof, terminating the application of the flames to the selected ones of the webs upon the stoppage of web advancement along the mandrel and severing predetermined lengths from the thus spirally wound body.

Still another object of this invention is to provide a novel method including each of the steps immediately above described and further including the step of skiving the longitudinal edge of the one web prior to the application of the emulsion thereto.

Another object of this invention is to provide a novel apparatus for manufacturing composite tubular elements such as spiral wound container bodies, including a mandrel, means for winding webs about the mandrel and advancing the webs therealong, means for driving the winding and advancing means, means for guiding the webs to the mandrel, means for applying heat to at least one of the webs prior to the winding thereof about the mandrel, and means for terminating the application of heat to the one web upon the stoppage of the winding and advancing means.

A further object of this invention is to provide a novel apparatus for manufacturing composite tubular elements including a mandrel, means for winding webs about the mandrel and advancing the webs therealong, means for driving the winding and advancing means, means for guiding the webs to the mandrel, means for applying heat to at least one of the webs prior to the winding thereof about the mandrel, means for applying a slip-agent to an innermost surface of an innermost web prior to the application thereof to the mandrel, and means for terminating the application of heat to the one web upon the stoppage of the winding and advancing means.

Still another object of this invention is to provide a novel apparatus for manufacturing composite tubular elements comprising a mandrel, means for winding webs about the mandrel and advancing the webs therealong, means for driving the winding and advancing means, first means for feeding an inner liner web to the mandrel, second means for feeding an inner structural web to the mandrel in overlying relationship to the liner web, third means for feeding an outer structural web to the mandrel in overlying relationship to the inner structural web, fourth means for feeding an outer cover web to the mandrel in overlying relationship to the outer structural web, means for heating at least two of the webs to render hot-melt bondable material thereon tacky, means for applying hot melt bondable material to a longitudinal edge of one of the webs, and means for controlling the application of heat to the two webs.

Still another object of this invention is to provide an apparatus of the type immediately above described and further including means for skiving the longitudinal edge of the one web prior to the application of the hot melt bondable material thereto.

Another object of this invention is to provide a novel apparatus of the type described including means for applying a slip agent to an innermost surface of the inner liner web to facilitate the advancement thereof along the mandrel, and means for applying a water soluble adhesive to an innermost surface of the outer cover web.

A further object of this invention is to provide a novel composite container body having at least four plies including an inner liner ply, a first intermediate structural ply, a second intermediate structural ply and an outermost cover ply, the first and second intermediate plies each having axially spaced and opposed surface portions, a first film of hot-melt bondable material between the inner and first intermediate plies, a second film of hot-melt bondable material between the first and second intermediate plies, means securing the cover ply to the second intermediate ply, and a film of hot-melt bondable material between the opposed surface portions of both the first and second intermediate plies whereby the solidified hot-melt bondable material fills and seals minute pin hole openings in the plies to render the body substantially liquid tight and the material between the opposed surface portions of the intermediate plies increases the axial compressive strength of the bodies as compared to conventional container bodies.

A further object of this invention is to provide a novel composite container of the type described wherein the securing means is a film of hot-melt bondable material between the cover and the second intermediate plies.

Still another object of this invention is to provide a novel composite container of the type described in which the securing means is a water soluble adhesive between the cover and second intermediate plies.

A further object of this invention is to provide a novel composite container as described above, in which the intermediate plies are constructed from paperstock material and the inner and cover plies are constructed from metallic foil, or alternatively, the inner ply is constructed from grease-proof, or glassine paper.

With the above, and other objects in view that will hereinafter appear, the nature of the invention will be more clearly understood by reference to the following detailed description, the appended claims and the several views illustrated in the accompanying drawings:

In the drawings:

FIGURE 1 is a schematic top plan view of a novel apparatus constructed in accordance with this invention for manufacturing tubular composite elements, and illustrates a plurality of heaters for heating selected ones of a plurality of webs prior to completion of the spiral winding thereof about a mandrel by a winding belt and a control system for regulating the operation of the heaters in response to both the speed and condition of the webs during the advancement along the mandrel.

FIGURE 2 is an enlarged fragmentary top perspective view of a portion of the apparatus of FIGURE 1, and more clearly illustrates the location of the heaters relative to the webs and nozzles for applying hot-melt bondable material adjacent longitudinal edge portions of several of the webs.

FIGURE 3 is an enlarged fragmentary sectional view taken along line 3—3 of FIGURE 2, and more clearly illustrates the arrangement of the heaters and nozzles of FIGURE 2.

FIGURE 4 is a fragmentary side elevational view of the apparatus taken along line 4—4 of FIGURE 3, and more clearly illustrates the position of two of the heaters relative to an outer structure web and the position of the third heater and outer cover web prior to the winding of the webs about the mandrel.

FIGURE 5 is a fragmentary side elevational view taken alonge line 5—5 of FIGURE 3, and illustrates three other heaters and the relationship thereof to an inner structural web and an inner liner web prior to the winding of these webs about the mandrel.

FIGURE 6 is a perspective view of a spiral wound composite container body formed in accordance with this invention.

FIGURE 7 is an enlarged transverse sectional view taken along line 7—7 of FIGURE 6, and illustrates the arrangement of the four webs or plies forming the container body and the joints therebetween.

FIGURE 8 is a highly enlarged fragmentary sectional view taken along line 8—8 of FIGURE 6, and illustrates the various plies of the container body and hot-melt bondable material therebetween.

FIGURE 9 is a highly enlarged fragmentary sectional view taken along a line similar to 8—8 of FIGURE 6, but illustrates a modified container body in which a water soluble adhesive is disposed between an outer structural ply and an outer cover ply and with axially opposing surfaces of each of two structural plies being skived.

FIGURE 10 is a highly enlarged fragmentary sectional view of another container body constructed in accordance with this invention, and illustrates butt joints between axially opposed surfaces of inner and outer structural plies of the container body.

FIGURE 11 is a reduced transverse cross-sectional view of the composite container body of FIGURE 10, and illustrates butt joints of inner and outer structural plies of the body.

Figure 1:
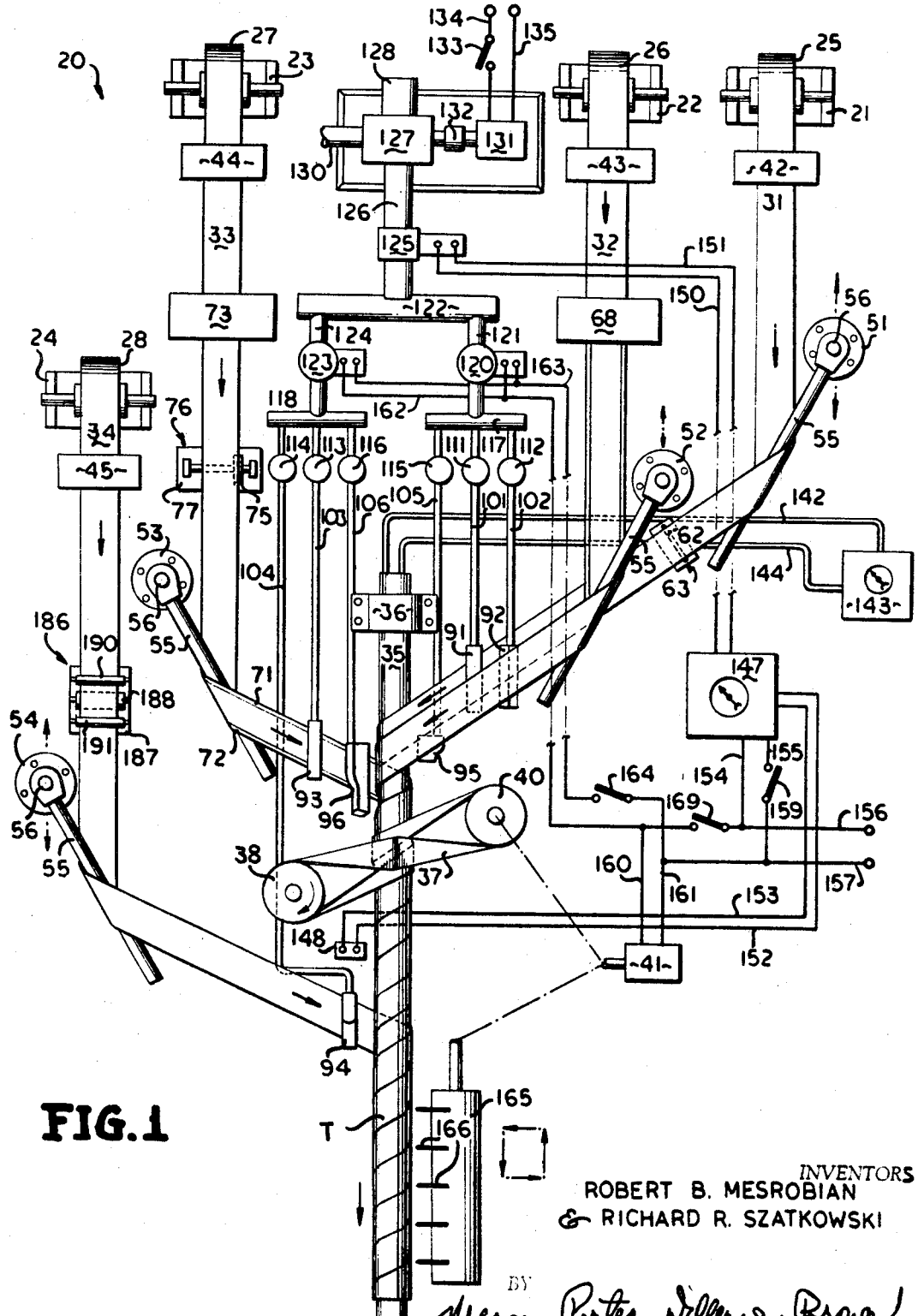

A novel apparatus constructed in accordance with this invention is fully illustrated in FIGURE 1 of the drawings, and is generally referred to by the reference numeral 20. The apparatus 20 comprises four unwind stands 21–24 each freely rotatably journalling a respective roll 25–28 of flexible material from which webs 31–34 respectively are drawn in the direction of the headed arrows to a mandrel 35 supported by a bracket 36 at one end portion to a suitable machine housing (not shown). The webs 31–34 are spirally wound about and advanced upon the mandrel 35 by a winding belt 37 entrained about a pair of pulleys 38, 40, the latter of which is driven by a variable speed motor 41 through a conventional drive connection (not shown). A respective tension controller 42–45 controls the tension of the respective webs 31–34 as the same are fed toward and wound about the mandrel 35 by the winding belt 37. Each of the webs 31–34 is guided during its advancement toward the mandrel 35 by a respective guide mechanism 51–54.

Each of the guide mechanisms 51–54 is adjustable in a direction generally parallel to the initial direction of movement of the webs 31–34, as indicated by the oppositely directed headed arrows at each of the guide mechanisms 51–54. The guide mechanisms 51–54 each include an identical arm 55 adjustably and pivotally mounted on an associated shaft 56 for adjusting the angle of approach of each of the webs 31–34 to the mandrel 35.

The web 31 is an inner liner web or ply, it being the first or innermost web applied to the mandrel 35, as is best illustrated in FIGURE 5 of the drawings. The inner liner web 31 in a preferred form of the invention is preferably a laminated structure composed of a strip 60 of paperstock material, such as parchment, glassine or grease-proof paper, upon an upper surface of which, as viewed in FIGURE 5, has been extruded a film 61 of hot-melt adhesive or hot-melt bondable material, such as low density polyethylene, modified polyethylenes or similar hot-melt adhesives which are rendered tacky and flowable upon the application of heat thereto. The lowermost surface of the paperstock strip 60, again as viewed in FIGURE 5 of the drawings, is preferably coated with a slip agent (not shown) for reducing the friction forces between the inner liner web 31 and the mandrel 35 as the former is advanced along the latter during the spiral winding operation. The particular slip agent employed depends to a major extent upon the product which is to be packaged in the completed composite container. In the case of edible products, the innermost surface of the inner liner web 31 is spray or roller coated with relatively insert material, such as vinyl dissolved in a solvent. If oil is to be packaged in the composite container the innermost uncoated surface of the strip 60 is preferably coated with an oily lubricant (not shown) by means of a felt pad 62 (FIGURE 1) having an upper portion contacting the undersurface of the inner liner web 31 and a lower portion immersed in a reservoir or tank 63 of the desired lubricant. The felt pad 62 spans the entire width of the inner liner web 31 and thus completely coats the uncoated surface of the strip 60 prior to the application of this surface against the mandrel 35.

The web 32 is an inner structural web, it being the next of the webs 31–34 wrapped about the mandrel 35 in overlapped and axially shifted relationship relative to the inner liner web 31 (FIGURE 1). The inner structural ply 32 is of a laminated construction including a strip 64 of paperstock material substantially thicker than the strip 60 of the inner liner web 31, and a film 65 of hot-melt adhesive or bondable material extruded upon the upper surface of the strip 64, as viewed in FIGURE 5 of the drawings. The film 65 is preferably polyethylene or a similar hot-melt adhesive. Longitudinal edge portions 66, 67 of the strip 64 of the inner structural ply 32 are skived by a conventional skiving machine 68 (FIGURE 1) which grinds or cuts the edges of the strip 64 to impart a generally trapezoidal cross-sectional configuration to the strip 64 (FIGURE 5) or alternatively to impart a generally parallelogram cross-sectional configuration to the strip 64 with the skived edges parallel to each other (not shown).

The web 33 is an outer structural web which is applied in overlapped relationship to the inner structural web 32 and axially shifted with respect to each of the webs 31, and 32, as is best illustrated in FIGURE 1 of the drawings. The outer structural web 33 is composed of a strip 70 of paperstock material having a thickness corresponding generally to the thickness of the strip 64 of the inner structural web 32. Longitudinal edge portions 71, 72 of the paperstock strip 70 are skived by a skiving machine 73 (FIGURE 1) to impart a generally trapezoidal transverse cross-sectional configuration to the strip 70. The web 33 is initially completely uncoated as it is drawn from the roll 27 but after departing the skiving machine 73, the longitudinal edge 72 is coated with a hot-melt adhesive or hot-melt bondable material in emulsion form by means of an edge coating wheel 75 of an edge coating mechanism 76 (FIGURE 1). The mechanism 76 includes a reservoir 77 in which the emulsion is housed. The coating wheel 75 is carried by a shaft (unnumbered) journalled to the reservoir 77 by brackets (unnumbered). The uppermost periphery of the edge coating wheel or roller 75 is in contact with the longitudinal edge 72 of the web 33 while the lowermost peripheral surface of the wheel is immersed in the emulsion. Conventional means (not shown) are provided for driving the wheel 75 at a speed equal to the speed of the web 33 to apply a uniform coating of the emulsion to the edge 72, or alternatively, the wheel may be undriven and freely rotated by the contact between the web 33 and the periphery of the wheel 75. The film or coating 74 is preferably a polyethylene-water emulsion, a typical example of which is Poly-Em 500 emulsion manufactured by the Spencer Chemical Company of Kansas City, Mo.

The web 34 is an outer cover web or ply, it being the final web wound about the mandrel 35 beyond the winding belt 37, as is best illustrated in FIGURE 1 of the drawings. The outer cover ply or web 34 is preferably a laminated construction (FIGURE 4) composed of an outermost strip of metallic foil, such as aluminum foil, having decorative or advertising matter printed or otherwise applied to an outermost surface thereof, an intermediate strip 81 of paperstock material, and an innermost film 82 of hot-melt adhesive extruded upon the innermost surface of the intermediate paperstock strip 81.

Prior to the winding of the webs 31–34 about the mandrel 35 in the sequence just described to form a generally tubular spiral wound tube T (FIGURE 1) the hot-melt adhesives or films 61, 65, 74 and 82 are heated by a plurality of heating means or heaters 91, 93 and 96. Two additional heaters 92 and 95 are cooperative with selected ones of the webs in a manner and for a purpose to be described hereafter. The heaters 91–96 are of the open flame gas-type ribbon heaters in which a plurality of parallel slots (not shown) in each heater includes a pair of high amplitude generally sinusoidal shaped corrugated metal ribbons forming main flame openings with low amplitude corrugated metal ribbons in nested form supporting the high amplitude ribbons in spaced relationship. Such heaters or burners are commercially available from the Flynn Burner Corporation, New Rochelle, N.Y.

The heaters 91–96 are connected by respective conduits 101–106 to respective valves 111–116 for adjusting the flames issuing from the respective heaters. The valves 111, 112 and 115 are connected by conduits or pipes (unnumbered) to a secondary header 117 while the valves 113, 114 and 116 are similarly connected to another secondary header 118. A solenoid operated valve 120 is located in a conduit 121 between the secondary header 117 and a primary header 122 while a similar solenoid operated valve 123 in a conduit 124 connects the secondary header 118 with the primary header 122. A motorized valve 125 in a main line or conduit 126 between the primary header 122 and a mixing pump 127 regulates the flow of a gas-air mixture delivered to the primary header 122 to maintain a constant temperature of the tube T just after the winding thereof in a manner to be described more fully hereafter. The mixing pump 127 includes an air inlet 128 and a gas inlet 130. A motor 131 drives the pump 127 through a drive connection 132 upon the closing of a switch 133 in one of a pair of conductors 134, 135 which are in turn connected to a suitable source of electrical energy.

As is best illustrated in FIGURES 2 through 5 of the drawings, the heater 91 applies heat in the form of open flames directly against the hot-melt adhesive film 61 of the inner liner web 31 to render the film 61 tacky and flowable prior to the overlapping of the paperstock strip 64 of the inner structural web 32 thereupon. The heater 92 preheats the paperstock strip 64 of the inner structural web 32 as is best illustrated in FIGURE 5 of the drawings. The pre-heating of the paperstock strip 64 allows better penetration of the film 61 into the paperstock strip 64 when the webs 31 and 32 are brought together on the mandrel 35. The heaters 93 and 94 (FIGURE 4) respectively heat the polyethylene emulsion 74 and the film 82 to drive off the solvent of the latter and render the now pure polyethylene of the emulsion coating 74 and the film 82 tacky and flowable. In this manner each of the hot-melt films on the webs 31, 33 and 34 is activated prior to the winding of these webs upon the mandrel 35 by the winding belt 37. The heater 93, in addition to melting the polyethylene emulsion 74, also pre-heats the paperstock 70 of the web 33 to achieve better adhesive bonding.

The heater 96 is longer than any one of the other heaters and is positioned closely adjacent the mandrel 35 at a point above where the outer structural web 33 is wrapped about the inner structural web 32. The size and position of the heater 96 permits the open flames issuing therefrom to directly heat the hot-melt adhesive 65 of the inner structural ply 32 and reheat a portion of the inner and outer structural plies already wound about the mandrel to achieve more efficient and effective bonding therebetween.

During the winding of the webs 31–34 by the winding belt 37 the flowable hot-melt adhesives 61, 65, 74 and 82 are urged into intimate bonding contact with uncoated surfaces of opposed webs under the pressure developed by the winding belt 37 and any gaps or fissures which might otherwise remain unfilled or uncoated under conventional practices are completely filled and sealed. This same pressure and the tacky flowable condition of the hot-melt films also seals any minute pin holes, opening or other flows in the webs 31–34.

To further insure a complete bonding of various webs, and in particular, to assure the perfection of a leak-proof seam or joint at the lapped longitudinal edge portion of the inner liner ply 31, the heater 95 is positioned adjacent the mandrel 35 and functions as a reheater by directing the flames issuing therefrom against a longitudinal edge of the inner liner ply already wound about the mandrel 35, as is best illustrated in FIGURE 5. The flames are applied directly to the hot-melt adhesive 61 at this longitudinal edge portion and serve to reheat the same after having been first heated by the heater 91.

The mandrel 35 is preferably maintained at an elevated temperature to prevent chilling of the hot-melt adhesive upon the application of the webs 31–34 to the mandrel and to maintain the films 61, 65 and 74 tacky and flowable until the passage thereof beyond the winding belt 37 to insure the formation of effective joints under the pressure of the winding belt 37. To this end the mandrel 35 is provided with a pair of longitudinally extending temperature control water passageways 140, 141 interconnected at a point beyond the winding belt 37. A conduit 142 places the passageway 140 in fluid communication with a conventional water temperature controller and circulator 143 which is also placed in fluid communication with the passageway 141 by a conduit 144. The controller and circulator 143 operates automatically and, in accordance with this invention, is preferably set to maintain the temperature of the mandrel 35 at approximately 160° F.

As was heretofore noted, the motorized valve 125 regulates the gas-air flow to the primary header 122 to to maintain a constant temperature of the wound tube T. The motorized valve 125 is responsive to a conventional potentiometric recording controller 147 which is in turn controlled by a conventional low range radiamatic detector 148 positioned between the winding belt 37 and the heater 94 (FIGURE 1). Conductors 150, 151 connect the valve 125 and the controller 147 and a pair of conductors 152, 153 connect the controller 147 and the detector 148. The controller 147 receives its power input over a pair of conductors 154, 155 which are respectively connected to conductors 156, 157. The conductors 156, 157 are connected to a suitable source of electrical energy. A manually operable switch 159, when closed, establishes an energizing circuit for the controller 147 over a path defined by the conductor 156, the conductor 154, the controller 147, the conductor 155, the closed switch 159 and the conductor 157. The motorized valve 125 may be a model 12R–3–37; the potentiometric recording controller 147 a model 152R13–RAH–13; and the low range radiamatic detector 148 a model RL, range 125° to 700° F. all being obtainable from Minneapolis-Honeywell Regulator Co., Minneapolis, Minn.

The variable speed motor 41 is also connected to the conductors 156, 157 by respective conductors 160, 161 with a switch 169 operative in a closed position to close an obvious circuit for energizing the motor 41.

The solenoid operated valves 120, 123 are connected by conductors 162, 163 and a switch 164 in the latter conductor to the conductors 160, and 157.

With the three switches 159, 169 and 164 closed and the controller 147 set at a preselected temperature, the valves 120, 123 and 125 are operative to supply a predetermined gas-air mixture to the heaters 91–96. Upon the detection of an increase in temperature by the detectors 148 beyond the temperature preselected by the controlled 147, the valve 125 is energized to reduce the gas-air mixture flow to the primary header 122 and thus decreases the heat emitted by the heaters causing a reduction in the temperature until the predetermined desired temperature is again obtained. Conversely, if the temperature of the tube T as detected by the detector 148 is lower than the preselected temperature of the controller 147, the valve 125 is energized in an opposite direction to increase the gas-air mixture to the primary header 122 and thus increase the heat applied to the plurality of webs.

By opening either one or both of the switches 169, 164 the solenoids of the solenoid operated valves 120, 123 are deenergized to close the valves and cut off the gas-air mixture to the heaters 91–96, thus preventing the webs from being burnt upon the stoppage of the advancement thereof.

It is to be noted that the outer cover web 34 is not applied to the outer structural web 33 under the influence of the winding belt 37. This is because the cover web 34 functions primarily as a decorative ply of the container bodies and lends little internal support or reinforcement thereto, primarily because of the relatively thin construction of the laminated web 34. However, if desired, the web 34 could be applied in overlapping relationship to the outer structural web 33 prior to the introduction thereof between the winding belt 37. The outer web 34 is wound under the tension set on the tension controller 45 which gives sufficient pressure at the web 34 against the outer structural web 33 to effect good adhesion.

The finally formed tube T is severed into discrete container bodies B (FIGURE 6) by a gang-type flying shear 165 (FIGURE 1) carrying a plurality of severing means or blades 166. The shear 165 is powered or driven by the variable speed motor 41 and by means of a conventional linkage travels in a generally rectilinear path as indicated by the arrows adjacent the shear in FIGURE 1. When the blades 166 are in contact with the tube T and moving at an identical speed therewith the rotation of the tube T against the blades 166 severs a plurality of the bodies B during each operative cycle of the shear.

The container body B formed in the manner just described is best illustrated in FIGURES 7 and 8 of the drawings and includes the inner ply 31 formed of the paper material strip 60 which, as has been heretofore noted, may be coated with either a vinyl solvent or an oily lubricant (not shown), and the hot-melt adhesive or polyethylene film 61. A lapped seam of the inner liner ply 31 is generally referred to by the reference numeral 170. Overlying the film 61 is the inner structural ply 32 composed of the skived paper material strip 64 and the hot-melt adhesive or polyethylene film 65. The outer structural ply 33 overlies the film 65 of the inner structural ply 32 with the hot-melt adhesive 74 forming a generally integral bridge between the film 65 and the hot-melt adhesive or polyethylene film 82 of the outer cover ply 34. The paper strip 81 and the metallic foil 80 next follow with an externally lapped seam of the outer cover ply 34 being generally referred to by the reference numeral 171.

In the practice of the method just described by the appartaus 20, the composite container bodies produced thereby, such as the body B, include a hot melt adhesive film between each of the opposing surfaces of the plies 31–34 as well as between the axially spaced opposed surfaces of the inner and outer structural plies 32, 33 respectively. However, in further accordance with this invention, a plurality of container bodies, corresponding to a container body 180 of FIGURE 9 can be produced by the apparatus 20 in the following manner.

The container body 180 is identical to the composite container body B except for the construction of an outer cover web or ply 181 thereof. Instead of the metallic foil-paperstock-hot melt adhesive construction of the outer cover ply 34, the outer cover ply 181 of the container body 180 is composed of an outer sheet 182 of metallic foil, suitably decorated and an intermediate sheet 183 of paperstock material. Absent in the container body 180 is a film of hot-melt adhesive corresponding to the film 82 of the body B which is replaced by a coating 184 of a water soluble adhesive, such as animal glue, bonding the outer cover ply 181 to an outer structural ply 185.

To form the container 180, the web 34 (FIGURE 1) is replaced by the web 181 composed solely of the joined metallic foil 182 and the paperstock strip 183. The web 181 is drawn from a roll of web material supported on the unwind stand 24 and advanced through the tension controller 45. Beyond the tension controller 45, the web 181 is fed through an adhesive applicator 186. The applicator 186 includes a reservoir 187 containing the water soluble adhesive. A coating roll or roller 188 is freely journalled in brackets (unnumbered) joined to the reservoir, and the web 181 is drawn over the upper periphery of the coating roller and beneath two roll or rolls 190, 191 similarly secured to the reservoir 187 and is thus coated with the water soluble adhesive 184. The coating roll 188 is, at its lowermost periphery as viewed in FIGURE 1, immersed in the adhesive of the reservoir.

The valve 114 is closed and the web 181 is wound about the mandrel 35 in the manner of the web 34 except that the heater 94 does not heat the web 181. However, upon being wound about the heated mandrel 35, the water of the water soluble adhesive 184 is driven off to a major extent by the latent heat of the three other heated webs augmenting the heat of the mandrel 35. In addition, a raw transverse severed edge 192 of the paperstock strip 183 is exposed to atmosphere and additionally aids in the drying of the adhesive 184. This rapid drying permits the container body 180 to be closed at one end, filled and closed shortly after being formed, and results in a construction somewhat less expensive than the container body B due to the less expensive cost of the adhesive 184 as compared to hot-melt adhesive. In addition, very little difference in the structural strength of the containers B and 180 is apparent because the outer cover ply 181 is relatively thin and only incidentally reinforces the container body 180, as in the case of the outer cover ply 34 of the composite container body B.

An additional composite container body 200 of FIGURES 10 and 11 can also be manufactured by the apparatus 20, and is constructed in the manner identical to that just described with respect to the container body 180 except for the following three exceptions:

First, an inner structural ply 201 and an outer structural ply 202 of the composite container body 200 are not skived in the manner of the respective plies 32 and 33 of the container body B.

Secondly, axially opposed surfaces 203, 204 and 205, 206 of the respective structural plies 201 and 202 define butt joints as opposed to the lapped joints of the respective plies 32, 33 of the container body B.

Lastly, but most important, additional hot-melt adhesive or hot-melt bondable material 207, 208, such as polyethylene is applied or extruded between the respective opposed surfaces 203, 204 and 205, 206 by respective extrusion nozzles 210, 211 (FIGURES 2 and 3) suitably supported at generally diametrically opposed portions of the mandrel 35. The nozzle 210 is positioned to direct the hot-melt adhesive 207 to the underside upstream longitudinal edge portion of the inner structural web 201, as viewed in FIGURES 2 and 3 of the drawings with the web 32 thereof corresponding to the position of the web 201 during the formation of the container body 200. The nozzle 211 is similarly positioned to direct the hot-melt adhesive 208 to the upper side upstream longitudinal edge portion of the outer structural web 202, as viewed in FIGURES 2 and 3 of the drawings with the web 33 thereof corresponding to the position of the web 202 during the formation of the container body 200.

The pressure exerted during the spiral winding of the container 200 by the winding belt 37 forces or squeezes the hot-melt adhesive 207, 208 thus extruded, between the surfaces 203, 204 and 205, 206 as shown in FIGURE 10.

While preferred forms of the invention have been illustrated and described heretofore, various modifications in the apparatus, methods and container bodies will be apparent to those skilled in the art after reviewing this disclosure and are considered to be covered hereby. For example, two or more of the structural webs can be coated with hot-melt adhesive on both sides, or only one of the two structural webs can be coated on each side while the other of the structural webs is uncoated. Where the inner structural plies are coated on the innermost surfaces the inner liner plies can be uncoated with the exception of one seam forming edge portion, and similarly, the inner surfaces of the outer cover plies may not be coated with the exception of one seam forming edge portion when the outer surfaces of the outer structural plies are coated.

By the practice of any one of the above methods and the application of heat to the webs just prior to the winding thereof no curing or aging time is necessary, as is the case of the container bodies B, and the method is more readily controllable and unsensitive to ambient atmospheric conditions.

Furthermore, in lieu of the open flame burners 91–96, the invention can be practiced employing electric contact type or radiant type heating means and where electric type contact heaters are employed, these are preferably retractably mounted for movement toward and away from the webs and normal thereto in response to web speed or stoppage. Such movement can be imparted to the electric contact-type heaters, by for example, providing the conduits 101–106 with pivotably couplings adjacent the electric heaters replacing the respective heaters 91–96. Conventional reversible piston-cylinder devices operative in response to detectors and connected between the heaters 91–96 and suitable housing structure of the apparatus 20 would achieve this disclosed movement to prevent burning of the webs and to control the temperature thereof.

It is also considered within the scope of this invention to reversely fold the exposed innermost edge portion of the seam 170 upon itself to dispose the raw transverse edge of paperstock internally of the body and prevent the direct exposure thereof to the contents packaged in such container when the inner liner web is of metal foil backed with ordinary fluid wettable paper like the outer cover webs 34 and 181. This construction prevents undesirable wicking action i.e., the absorption of a packaged product through the raw edge of the permeable paper and the possible permeation thereof through the body which would deteriorate and weaken the container. When the inner liner web is metal foil without a paper backing with the polyethylene or other hot melt coating applied directly to the metal foil, this problem of wicking does not occur, hence the seam 170 would be as illustrated with the foil being used as a substitute for the paperstock 60.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A method of manufacturing composite container bodies comprising the steps of advancing at least four webs of material including an inner liner web, an inner structural web, an outer structural web and an outer cover web along predetermined paths toward an area at which the webs are unified, spiral winding the inner liner web into an inner liner tube with hot-melt bondable film material carried thereby being disposed externally of said inner liner tube, heating the film material of the inner liner web prior to the formation of the inner liner tube to render the film material tacky and flowable, spiral winding the inner structural web into an inner structural tube atop the inner liner tube with hot-melt bondable film material carried thereby being disposed externally of said inner structural tube, heating the film material of the inner structural web prior to the formation of the inner structural tube to render the film material thereof tacky and flowable, spiral winding the outer structural web into an outer structural tube atop the inner structural tube with hot-melt bondable film material carried along a longitudinal edge portion thereof being disposed externally of said outer structural tube, heating the film material of the outer structural web prior to the formation of the outer structural tube to render the film material thereof tacky and flowable, skiving the longitudinal edges of the inner and outer structural webs prior to the formation of the inner and outer structural tubes therefrom, reheating portions of the wound inner and outer structural tubes, spiral winding the outer cover web into an outer cover tube atop the outer structural tube with hot-melt bondable-film material carried thereby being disposed internally of said outer cover tube, heating the film material of the outer cover web prior to the formation of the outer cover tube to render the film material thereof tacky and flowable, all of said mentioned heating steps being carried out by direct open flame heating, and cutting-off the open flame heating upon the termination of the advancement of the webs.

2. The method of manufacturing composite container bodies as defined in claim 1 including the step of applying the film material to the longitudinal edge portion of the outer structural web as the same is being advanced.

3. The method of manufacturing composite container bodies as defined in claim 1 including the steps of guiding the inner and outer structural webs into longitudinal butt-relationship, and effecting the spiral winding thereof under sufficient pressure to cause the film materials to fill any pin holes in the webs and any gaps between the longitudinal edges of the inner and outer structural webs.

4. The method of manufacturing composite containers as defined in claim 1 including the step of maintaining the wound tubes at a constant temperature by continually sensing the temperature of the wound tubes, and regulating the heating in response to the sensed temperature.

5. The method of manufacturing composite containers as defined in claim 1 including the step of maintaining the wound tubes at a constant temperature by continually sensing the temperature of the wound tubes, comparing the sensed temperature with a preselected temperature, and regulating the heating in response to a difference between the sensed and preselected temperatures.

6. A method of manufacturing composite container bodies comprising the steps of advancing at least four webs of material including an inner liner web, an inner structural web, an outer structural web and an outer cover web along predetermined paths toward an area at which the webs are unified, spiral winding the inner liner web into an inner liner tube with hot-melt bondable film material carried thereby being disposed externally of said inner liner tube, heating the film material of the inner liner web prior to the formation of the inner liner tube to render the film material tacky and flowable, spiral winding the inner structural web into an inner structural tube atop the inner liner tube with hot-melt bondable film material carried thereby being disposed externally of said inner structural tube, heating the film material of the inner structural web prior to the formation of the inner structural tube to render the film material thereof tacky and flowable, spiral winding the outer structural web into an outer structural tube atop the inner structural tube with hot-melt bondable film material carried along a longitudinal edge portion thereof being disposed externally of said outer structural tube, heating the film material of the outer structural web prior to the formation of the outer structural tube to render the film material thereof tacky and flowable, skiving the longitudinal edges of the inner and outer structural webs prior to the formation of the inner and outer structural tubes therefrom, reheating portions of the wound inner and outer structural tubes, applying a water soluble adhesive to an inner surface of the outer cover web, spiral winding the outer cover web into an outer cover tube atop the outer structural tube with the water soluble adhesive being disposed internally of said outer cover tube, heating the water soluble adhesive prior to the formation of the outer cover tube to drive off the solvent thereof, all of said mentioned heating steps being carried out by direct open flame heating, and cutting-off the open flame heating upon the termination of the advancement of the webs.

7. A method of manufacturing composite container bodies comprising the steps of advancing at least four webs of material including an inner liner web, and inner structural web, and outer structural web and an outer cover web along predetermined paths toward an area at which the webs are unified, spiral winding the inner liner web into an inner liner tube with hot-melt bondable film material carried thereby being disposed externally of said inner liner tube, heating the film material of the inner liner web prior to the formation of the inner liner tube to render the film material tacky and flowable, spiral winding the inner structural web into an inner structural tube atop the inner liner tube with hot-melt bondable film material carried thereby being disposed externally of said inner structural tube, heating the film material of the inner structural web prior to the formation of the inner structural tube to render the film material thereof tacky and flowable, spiral winding the outer structural web into an outer structural tube atop the inner structural tube with hot-melt bondable film material carried along a longitudinal edge portion thereof being externally of said outer structural tube, heating the film material of the outer structural web prior to the formation of the outer structural tube to render the film material thereof tacky and flowable, spiral winding the outer cover web into an outer cover tube atop the outer structural tube with hot-melt bondable film material carried thereby being disposed internally of said outer cover tube, heating the film material of the outer cover web prior to the formation of the outer cover tube to render the film material thereof tacky and flowable, all of said mentioned heating steps being carried out by direct open flame heating, and cutting-off the open flame heating upon the termination of the advancement of the webs.

8. The method of manufacturing composite container bodies as defined in claim 7 including the step of applying the film material to the longitudinal edge portion of the outer structural web as the same is being advanced.

9. The method of manufacturing composite containers as defined in claim 7 including the step of maintaining the wound tubes at a constant temperature by continually sensing the temperature of the wound tubes, and regulating the heating in response to the sensed temperature.

10. The method of manufacturing composite containers as defined in claim 8 including the step of maintaining the wound tubes at a constant temperature by continually sensing the temperature of the wound tubes, and regulating the heating in response to the sensed temperature.

11. The method of manufacturing composite containers as defined in claim 8 including the step of maintaining the wound tubes at a constant temperature by continually sensing the temperature of the wound tubes, comparing the sensed temperature with a preselected temperature, and regulating the heating in response to a difference between the sensed and preselected temperatures.

References Cited
UNITED STATES PATENTS

| | | | |
|---|---|---|---|
| 1,990,248 | 2/1935 | Parker | 156—190 XR |
| 3,081,213 | 3/1963 | Chinn | 156—244 XR |
| 3,228,308 | 1/1966 | Denenberg | 156—190 XR |
| 2,785,700 | 3/1957 | Yovanovich | 156—195 XR |
| 3,300,350 | 1/1957 | Flynn | 156—497 XR |
| 3,280,709 | 10/1966 | Elam | 156—190 XR |
| 3,159,515 | 12/1964 | Dunlap et al. | 156—190 |
| 2,354,556 | 7/1944 | Stahl | 156—189 |
| 2,604,830 | 7/1952 | Heinle | 156—190 |
| 3,196,762 | 7/1965 | Schmeltz | 156—190 XR |

FOREIGN PATENTS 478,949  11/1951  Canada.

EARL M. BERGERT, *Primary Examiner.*

PHILIP DIER, *Assistant Examiner.*